(12) United States Patent
Duncan et al.

(10) Patent No.: US 10,998,784 B2
(45) Date of Patent: May 4, 2021

(54) APPLIANCE, MOTOR OR STATOR

(71) Applicant: FISHER & PAYKEL APPLIANCES LIMITED, Auckland (NZ)

(72) Inventors: Gerald David Duncan, Auckland (NZ); Kerrin Edmund Burnnand, Auckland (NZ); Gregory Paul Hill, Auckland (NZ)

(73) Assignee: Fisher & Paykel Appliances Limited, Auckland (NZ)

( * ) Notice: Subject to any disclaimer, the term of this patent is extended or adjusted under 35 U.S.C. 154(b) by 306 days.

(21) Appl. No.: 15/874,764

(22) Filed: Jan. 18, 2018

(65) Prior Publication Data
US 2018/0159394 A1    Jun. 7, 2018

Related U.S. Application Data

(63) Continuation of application No. 13/997,181, filed as application No. PCT/NZ2011/000266 on Dec. 20, 2011, now Pat. No. 9,906,084.

(Continued)

(51) Int. Cl.
*H02K 1/27* (2006.01)
*D06F 37/20* (2006.01)
(Continued)

(52) U.S. Cl.
CPC ......... *H02K 1/2786* (2013.01); *D06F 37/206* (2013.01); *D06F 37/30* (2013.01);
(Continued)

(58) Field of Classification Search
None
See application file for complete search history.

(56) References Cited

U.S. PATENT DOCUMENTS

| 4,613,780 A | 9/1986 | Fritzsche |
| 5,040,285 A * | 8/1991 | Williams ............. D06F 37/304 264/272.2 |

(Continued)

FOREIGN PATENT DOCUMENTS

| AU | 753411 | 5/2001 |
| AU | 2003268590 | 7/2004 |

(Continued)

OTHER PUBLICATIONS

English translation of DE102007017215A1.*
International Search Report; Application No. PCT/NZ2011/000266; Filed Dec. 20, 2011.

*Primary Examiner* — Levon J Shahinian
*Assistant Examiner* — Jason P Riggleman
(74) *Attorney, Agent, or Firm* — Knobbe, Martens, Olson & Bear, LLP

(57) ABSTRACT

A motor suited for use in a direct drive laundry machine. The described motor has a stator core including an annular ring with an inner diameter between 120 mm and 250 mm, a radial width between 5 mm and 15 mm, and 24 or 27 stator poles projecting outward from the annular ring a distance of between 15 mm and 40 mm. Each stator pole is associated with one of three phase windings. A rotor for the motor has inwardly facing permanent magnet poles whereby the ratio of rotor poles to stator poles is 4:3.

10 Claims, 10 Drawing Sheets

Related U.S. Application Data

(60) Provisional application No. 61/426,434, filed on Dec. 22, 2010.

(51) Int. Cl.
  D06F 37/30 (2020.01)
  H02K 1/18 (2006.01)
  H02K 21/22 (2006.01)
  H02K 1/14 (2006.01)
  H02K 3/52 (2006.01)

(52) U.S. Cl.
  CPC .............. *H02K 1/146* (2013.01); *H02K 1/187* (2013.01); *H02K 21/22* (2013.01); *H02K 1/148* (2013.01); *H02K 3/522* (2013.01)

(56) References Cited

U.S. PATENT DOCUMENTS

| | | | |
|---|---|---|---|
| 6,050,113 A * | 4/2000 | Skrippek | D06F 37/304 68/140 |
| 6,093,984 A | 7/2000 | Shiga et al. | |
| 6,148,647 A | 11/2000 | Kabeya et al. | |
| 6,265,804 B1 | 7/2001 | Nitta et al. | |
| 6,341,507 B1 | 1/2002 | Rode et al. | |
| 6,460,382 B1 | 10/2002 | Kim et al. | |
| 6,474,114 B1 | 11/2002 | Ito et al. | |
| 6,510,716 B1 | 1/2003 | Kim et al. | |
| 6,681,602 B2 | 1/2004 | Heyder et al. | |
| 7,116,031 B2 | 10/2006 | Ahn | |
| 7,138,741 B2 | 11/2006 | Lee | |
| 7,161,271 B2 | 1/2007 | Kim et al. | |
| 7,221,072 B2 | 5/2007 | Ahn | |
| 7,262,540 B2 | 8/2007 | Lee | |
| 7,271,512 B2 | 9/2007 | Lee et al. | |
| 7,271,519 B2 | 9/2007 | Lee | |
| 7,294,942 B2 | 11/2007 | Lee et al. | |
| 7,336,014 B2 | 2/2008 | Lee | |
| 7,342,344 B2 | 3/2008 | Lee | |
| 7,362,028 B2 | 4/2008 | Lee | |
| 7,380,424 B2 | 6/2008 | Kim et al. | |
| 7,418,843 B2 | 9/2008 | Kim et al. | |
| 7,441,421 B2 | 10/2008 | Kim et al. | |
| 7,444,841 B2 | 11/2008 | Kim et al. | |
| 7,459,826 B2 | 12/2008 | Lee | |
| 7,478,546 B2 | 1/2009 | Kim et al. | |
| 7,490,489 B2 | 2/2009 | Kim et al. | |
| 7,578,149 B2 | 8/2009 | Schmid et al. | |
| 7,596,973 B2 | 10/2009 | Kim et al. | |
| 7,615,895 B2 | 11/2009 | Lee et al. | |
| 7,728,481 B2 | 6/2010 | Lee | |
| 7,755,228 B2 | 7/2010 | Kim et al. | |
| 7,777,386 B2 | 8/2010 | Horst | |
| 7,872,391 B2 | 1/2011 | Lim | |
| 2006/0096329 A1 | 5/2006 | Kim et al. | |
| 2007/0074542 A1 | 4/2007 | Kim | |
| 2007/0113596 A1 | 5/2007 | Kim et al. | |
| 2008/0016920 A1 | 1/2008 | Ahn et al. | |
| 2008/0122300 A1 | 5/2008 | Cho et al. | |
| 2008/0148785 A1 | 6/2008 | Lee et al. | |
| 2009/0100879 A1 | 4/2009 | Kim et al. | |
| 2009/0107187 A1 | 4/2009 | Kim et al. | |
| 2009/0108693 A1 | 4/2009 | Jun et al. | |
| 2009/0113942 A1 | 5/2009 | Ha | |
| 2009/0113943 A1 | 5/2009 | Lee | |
| 2009/0178444 A1 | 7/2009 | Choi | |
| 2009/0199599 A1* | 8/2009 | Choi | H02K 7/14 68/140 |
| 2009/0211312 A1 | 8/2009 | Ahn et al. | |
| 2009/0230812 A1 | 9/2009 | Cho et al. | |
| 2010/0101281 A1 | 4/2010 | Ha | |
| 2010/0236297 A1 | 9/2010 | Ahn et al. | |
| 2011/0016929 A1 | 1/2011 | Ahn | |

FOREIGN PATENT DOCUMENTS

| | | |
|---|---|---|
| AU | 2004226978 | 5/2005 |
| AU | 2004203580 | 9/2005 |
| AU | 2005215960 | 9/2005 |
| AU | 2005220119 | 9/2005 |
| AU | 2006343910 | 11/2007 |
| AU | 2007261845 | 12/2007 |
| CN | 1464620 A | 12/2003 |
| CN | 1510199 A | 7/2004 |
| CN | 1566478 A * | 1/2005 |
| CN | 101192767 A | 6/2008 |
| CN | 101816117 A | 8/2010 |
| CN | 201590731 U | 9/2010 |
| DE | 19806258 A1 | 8/1998 |
| DE | 102007017215 A1 * | 10/2008 |
| DE | 112006003892 | 4/2009 |
| DE | 112006003893 | 4/2009 |
| EP | 0146673 A1 * | 4/1981 |
| EP | 0361775 A2 | 4/1990 |
| EP | 0 410 784 | 1/1991 |
| EP | 0410784 A1 * | 1/1991 |
| EP | 0 909 477 | 4/1999 |
| EP | 0 960 231 | 12/1999 |
| EP | 0 982 425 | 3/2000 |
| EP | 1 094 144 | 4/2001 |
| EP | 1 240 376 | 9/2002 |
| EP | 1 428 924 | 6/2004 |
| EP | 1 529 870 | 5/2005 |
| EP | 1 541 738 | 6/2005 |
| EP | 1 602 767 | 12/2005 |
| EP | 1 602 768 | 12/2005 |
| EP | 1 602 769 | 12/2005 |
| EP | 1 707 661 | 10/2006 |
| EP | 1 707 662 | 10/2006 |
| EP | 1 733 090 | 12/2006 |
| EP | 1 810 387 | 7/2007 |
| EP | 2 052 104 | 4/2009 |
| EP | 2 055 823 | 5/2009 |
| EP | 2 060 669 | 5/2009 |
| EP | 1 718 793 | 11/2011 |
| EP | 1709721 B1 | 12/2015 |
| JP | 57-049359 | 3/1982 |
| JP | 59-129557 | 7/1984 |
| JP | 60-121953 | 6/1985 |
| JP | 60-261344 | 12/1985 |
| JP | 62-281740 | 12/1987 |
| JP | 05-101956 | 4/1993 |
| JP | 08-275419 | 10/1996 |
| JP | 2000-069697 | 3/2000 |
| JP | 2000-116037 | 4/2000 |
| JP | 2001-280249 | 10/2001 |
| JP | 2002-095196 | 3/2002 |
| JP | 2002-204546 | 7/2002 |
| JP | 2005-176597 | 6/2005 |
| JP | 2007049860 A | 2/2007 |
| KR | 10-0395378 | 8/2003 |
| KR | 10-0413288 | 12/2003 |
| KR | 10-0557546 | 2/2006 |
| KR | 10-2006-0053628 | 5/2006 |
| KR | 10-0682661 | 2/2007 |
| KR | 1020070038781 A | 4/2007 |
| KR | 10-2008-0076055 | 8/2008 |
| KR | 10-0856032 | 8/2008 |
| KR | 10-2009-0026918 | 3/2009 |
| NZ | 337279 | 9/2000 |
| WO | WO 1998/000902 A1 | 1/1998 |
| WO | WO 03/080915 | 10/2003 |
| WO | WO 05/084142 | 9/2005 |
| WO | WO 07/136145 | 11/2007 |
| WO | WO 07/145471 | 12/2007 |
| WO | WO 07/148920 | 12/2007 |
| WO | WO 09/003913 | 1/2009 |
| WO | WO 09/156294 | 12/2009 |

\* cited by examiner

APPLIANCE, MOTOR OR STATOR

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 C.F.R. § 1.57 and made a part of the present disclosure.

FIELD OF THE INVENTION

The present invention relates to electric motors and magnet elements for use in such motors, and particularly motors having an external rotor of a type that are used as the main drive motor for a domestic laundry machine or other apparatus.

BACKGROUND TO THE INVENTION

The present invention relates to motors for particular use in laundry machines. The motors are of a type including an internal stator with radially extending stator poles and an external rotor with inwardly facing rotor poles. In motors having a 4:3 ratio of rotor poles to stator poles, for use with direct drive laundry washing machines, more than 30 stator poles has been typical.

SUMMARY OF THE INVENTION

An object of the present invention is to provide a stator, a motor including the stator, or a laundry machine including the motor, which improve on the prior art, or which will at least provide the public or industry with a useful choice.

In one aspect, the present invention may broadly be said to consist in a stator comprising a core of magnetically permeable material including an annular ring with an inner circumference between 120 mm diameter and 250 mm diameter and a width between 5 mm and 15 mm, 24 or 27 radiating extending poles spaced around the circumference of the annular ring, the poles extending outward from the annular ring a distance between 15 mm and 40 mm, three phase windings, each winding comprising a plurality of coils arranged on one third of the pole cores, the windings arranged on the pole cores such that each pole core is associated with only one winding, which is different from the winding associated with each of the two immediately adjacent pole cores and the two immediately adjacent pole cores are associated with different windings, an insulator insulating the pole cores from the windings.

According to a further aspect, the core has a depth between 10 mm and 35 mm.

According to a further aspect, the annular ring is at least largely encapsulated by an insulator.

According to a further aspect, the insulator over the pole cores and annular ring is an over moulded plastic material.

According to a further aspect, the diameter of the inner circumference of the annular ring is between 150 mm and 230 mm.

According to a further aspect, the diameter of the inner circumference of the annular ring is between 200 mm and 220 mm.

According to a further aspect, the width of the annular ring is between 5 mm and 10 mm.

According to a further aspect, the width of the annular ring is between 7 mm and 10 mm.

According to a further aspect, the depth or thickness of the annular ring is between 12 mm and 15 mm.

According to a further aspect, the depth or thickness of the annular ring is between 17 mm and 23 mm.

According to a further aspect, the core comprises at least one stack of laminations, each lamination lying in a plane substantially parallel to the plane of the annular ring.

According to a further aspect, the stack or stacks of laminations comprise a stack formed from a helical coil of steel strip such that each layer in the stack comprises a turn in the helix.

According to a further aspect, the steel strip includes a band forming the annular ring and extended portions forming the pole cores.

According to a further aspect, the stack or stacks of laminations comprises multiple stacks joined at their ends, each stack including a segment of the annular ring and one or more extending pole cores.

According to a further aspect, each segment of the annular ring joins with adjacent segments of the annular ring by interlocking shapes at the abutting ends (such as a dove tail joint).

According to a further aspect, each segment includes a plurality of radially extending pole cores.

According to a further aspect, the stator includes 27 radially extending pole cores and the core comprises 6 stacks, 3 stacks having 5 radially extending pole cores each and 3 stacks having 4 radially extending pole cores each.

According to a further aspect, the stator has only 27 radially extending pole cores.

According to a further aspect, the stator includes a plurality of fastening locations for mounting the stator to a machine, each fastening location being centred a distance radially inside the inner surface of the annular ring of the core, this distance being greater than the length that the pole cores extend beyond the outer surface of the annular ring.

According to a further aspect, fastening locations for fastening the stator to the machine have centres more than 40 mm from the centre of the stator.

According to a further aspect, the fastening locations are between 40 mm and 80 mm from the centre of the stator.

According to a further aspect, the fastening locations are between 50 mm and 75 mm from the centre of the stator.

According to a further aspect, the fastening locations are between 60 mm and 70 mm from the centre of the stator.

According to a further aspect, the stator includes a diaphragm portion extending inward from the annular ring to occupy an area within the perimeter of the ring and that includes the fastening locations.

According to a further aspect, the fastening locations comprise apertures through the diaphragm portion.

According to a further aspect, the diaphragm portion is annular and occupies an area between the annular ring and a circular aperture spaced inward of the mounting locations.

According to a further aspect, the diaphragm includes at least one substantially frustoconical surface in a region between the mounting locations and the annular ring.

According to a further aspect, the diaphragm includes at least two substantially frustoconical portions between the mounting locations and the annular ring, the frustoconical portions joining to form a circular ridge (when viewed from one side of the stator) and valley (when viewed from the other side of the stator).

According to a further aspect, the height of the ridge or valley is less than the height of the annular ring.

In a further aspect, the present invention may broadly be said to consist in a stator comprising a core of magnetically permeable material including an annular ring with an inner circumference between 120 mm diameter and 250 mm diameter and a width between 5 mm and 15 mm, a plurality of radiating extending poles spaced around the circumference of the annular ring, the poles extending outward from the annular ring between 15 mm and 40 mm, 3 phase windings, each winding comprising a plurality of coils arranged on ⅓ of the pole cores, an insulator insulating the pole cores from the windings, a plurality of mounting points for mounting the stator to a machine, each mounting point being centred a distance radially inside the inner surface of the annular ring of the core, this distance being greater than the length that the pole cores extend beyond the outer surface of the annular ring, and more than 40 mm from the centre of the stator.

According to a further aspect, fastening locations for fastening the stator to the machine have centres more than 40 mm from the centre of the stator.

According to a further aspect, the fastening locations are between 40 mm and 80 mm from the centre of the stator.

According to a further aspect, the fastening locations are between 50 mm and 75 mm from the centre of the stator.

According to a further aspect, the fastening locations are between 60 mm and 70 mm from the centre of the stator.

According to a further aspect, the stator includes a diaphragm portion extending inward from the annular ring to occupy an area within the perimeter of the ring and that includes the fastening locations.

According to a further aspect, the fastening locations comprise apertures through the diaphragm portion.

According to a further aspect, the diaphragm portion is annular and occupies an area between the annular ring and a circular aperture spaced inward of the mounting locations.

According to a further aspect, the diaphragm includes at least one substantially frustoconical surface in a region between the mounting locations and the annular ring.

According to a further aspect, the diaphragm includes at least two substantially frustoconical portions between the mounting locations and the annular ring, the frustoconical portions joining to form a circular ridge (when viewed from one side of the stator) and valley (when viewed from the other side of the stator).

According to a further aspect, the height of the ridge or valley is less than the height of the annular ring.

In a further aspect, the present invention may broadly be said to consist in a motor for use in a washing machine, said motor comprising a stator as described above, a rotor concentric with said stator with a permanent magnet ring outside said stator and rotor poles facing the ends of said stator poles.

According to a further aspect, the rotor comprises a plurality of magnet elements with two lateral edges each with magnetic domains aligned anisotropically to form a domain alignment pattern, the plurality of magnets being arranged to form a permanent magnet ring with an inner face and an outer face, a rigid support holding said magnet elements in said ring arrangement, wherein the magnetic domain alignment pattern in each magnet element has an orientation that varies substantially continuously across at least part of the magnet element between its lateral edges from an orientation that has a predominant radial component at a pole of the magnet element to an orientation that has a least some tangential component at one lateral edge of the magnet element, wherein the magnet elements are magnetised to produce a resulting magnetic flux field.

According to a further aspect, one or more of the magnet elements have a chamfer at the intersection of each lateral edge with the front edge, wherein the front edge is the edge at the inner face of the rotor.

According to a further aspect, at both lateral edges the orientation of the magnetic domain alignment pattern has significant tangential component which result in the magnetic domain alignment pattern having an orientation of at least 15 degrees with respect to the lateral edges.

According to a further aspect, the orientation varies substantially non-linearly over the magnet element.

According to a further aspect, the resulting magnetic flux field has poles with alternating polarity spaced around the ring, the poles being aligned radially with respect to the permanent magnet ring, and wherein the resulting magnetic flux field of the permanent magnet ring traverses between adjacent poles of opposite polarities and between those poles is focused to extend beyond the boundary defined by the inner face, but remain at least partially constrained within the boundary defined by the outer face of the permanent magnet ring, According to a further aspect, the portion of the resulting magnetic flux field between adjacent poles extending beyond the boundary defined by the inner face of the permanent magnet ring magnet element has an orientation that varies continuously wherein between the poles, the orientation varies from an orientation that has a predominant radial component at the pole to an orientation that has a predominant tangential component at the mid-point between the poles, and extending radially from the inner face, the orientation varies from an orientation that has a predominant radial component at an inner face to an orientation that has an increasingly tangential component with distance from the inner face.

In a further aspect, the present invention may broadly be said to consist in a washing machine including an electronically commutated motor as described above, said stator being coupled to a non-rotating tub or housing of the washing machine, said rotor being coupled to a rotating drum of the washing machine.

According to a further aspect, washing machine is a top loading washing machine comprising: an outer wrapper, a tub suspended in the outer wrapper, and a rotating drum in the tub.

According to a further aspect, the washing machine is a horizontal axis machine comprising: an outer wrapper, a rotating drum housing, and a rotating drum in the housing.

According to a further aspect, the washing machine is a horizontal axis machine with top loading access comprising: an outer wrapper, a tub, and a rotating drum in the tub.

In this specification where reference has been made to patent specifications, other external documents, or other sources of information, this is generally for the purpose of providing a context for discussing the features of the invention. Unless specifically stated otherwise, reference to such external documents is not to be construed as an admission that such documents, or such sources of information, in any jurisdiction, are prior art, or form part of the common general knowledge in the art.

The term "comprising" as used in this specification means "consisting at least in part of". Related terms such as "comprise" and "comprised" are to be interpreted in the same manner.

It is intended that reference to a range of numbers disclosed herein (for example, 1 to 10) also incorporates reference to all rational numbers within that range (for example, 1, 1.1, 2, 3, 3.9, 4, 5, 6, 6.5, 7, 8, 9 and 10) and also any range of rational numbers within that range (for example, 2 to 8, 1.5 to 5.5 and 3.1 to 4.7).

To those skilled in the art to which the invention relates, many changes in construction and widely differing embodiments and applications of the invention will suggest themselves without departing from the scope of the invention as defined in the appended claims. The disclosures and the descriptions herein are purely illustrative and are not intended to be in any sense limiting

DETAILED DESCRIPTION OF THE PREFERRED EMBODIMENTS

Figure 1:
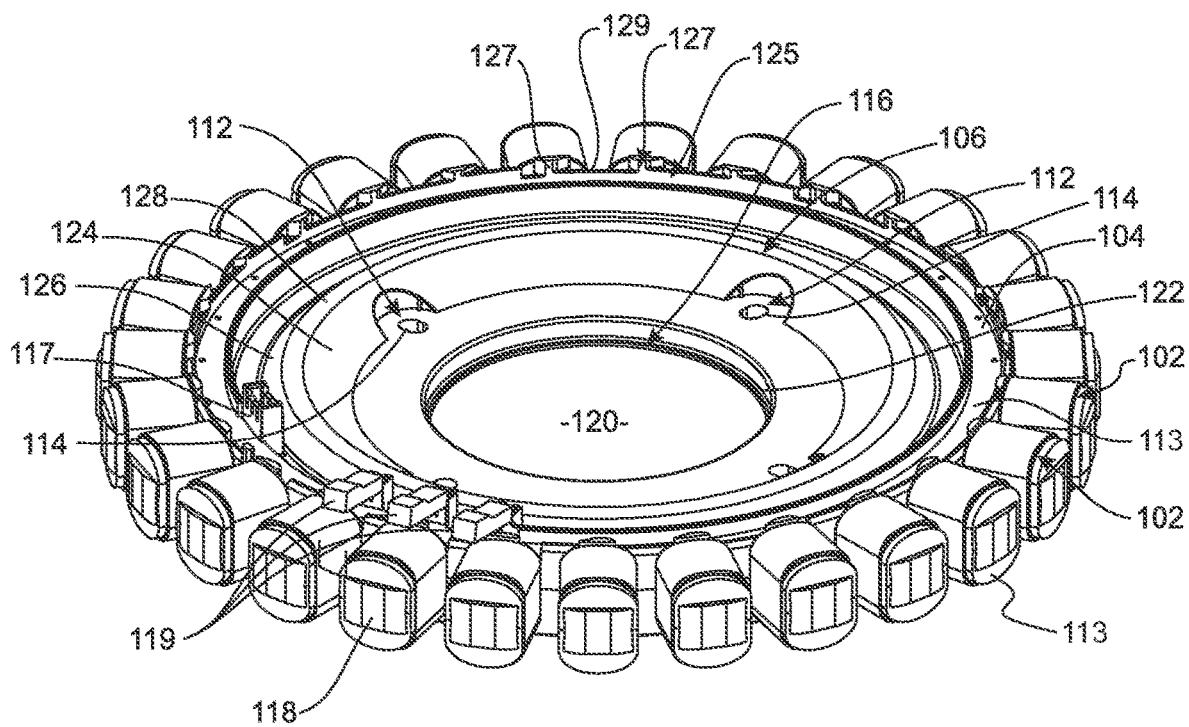
FIG. 1 is a perspective view of a stator according to one embodiment of the present invention.
Figure 2:
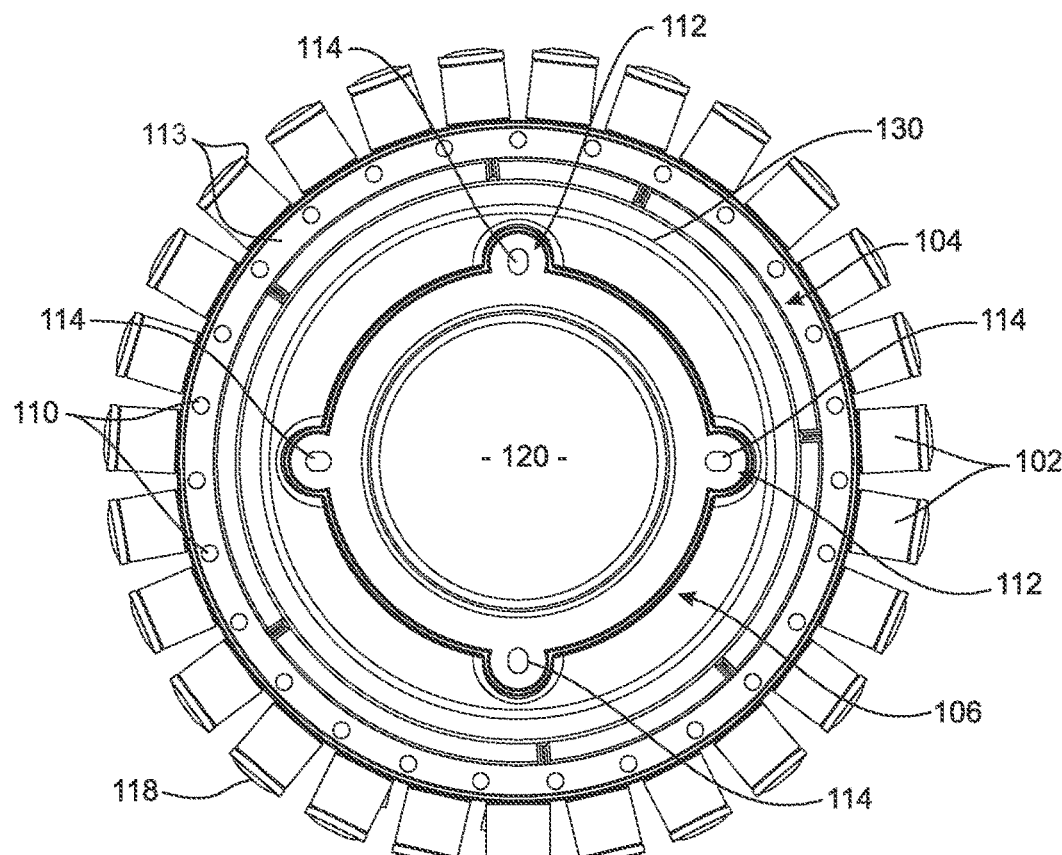
FIG. 2 is a plan view from below of the stator of FIG. 1.
Figure 3:
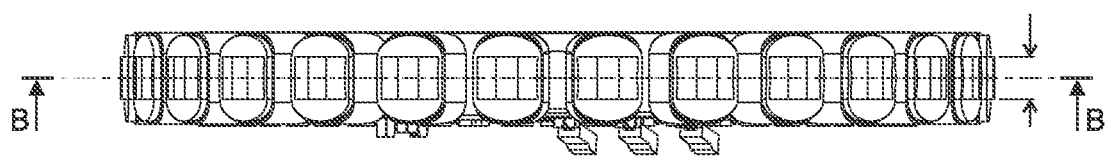
FIG. 3 is a side elevation of the stator of FIG. 2.

A stator according to one embodiment of the present invention is illustrated in FIGS. 1 to 5.

The stator 100 has 27 poles 102. The stator generally includes an annular ring portion 104, a mounting portion 106 inside the ring portion, and a plurality of poles 102 extending radially from the outside surface of the annular ring portion 104.

In construction, the stator generally comprises a magnetically permeable core 108, an insulator structure 113 surrounding the core, or surrounding most of the core, and conductive windings arranged on the poles 102.

In the illustrated embodiment, the insulating structure 113 comprises a layer of plastic over moulded over the magnetically permeable core. The over moulded plastic covers at least those parts of the core which support and locate the conductive windings. In the illustrated embodiment, the plastic covers all of the radially extending pole cores except the outer end surfaces 118. In an alternative embodiment, the insulating plastic may also cover the end surfaces of the pole cores.

Holes or partial holes 110 may extend through the plastic at the annular ring portion of the stator. These may result from pins or other locating devices used to hold the stator core in place during the moulding process.

Figure 4:
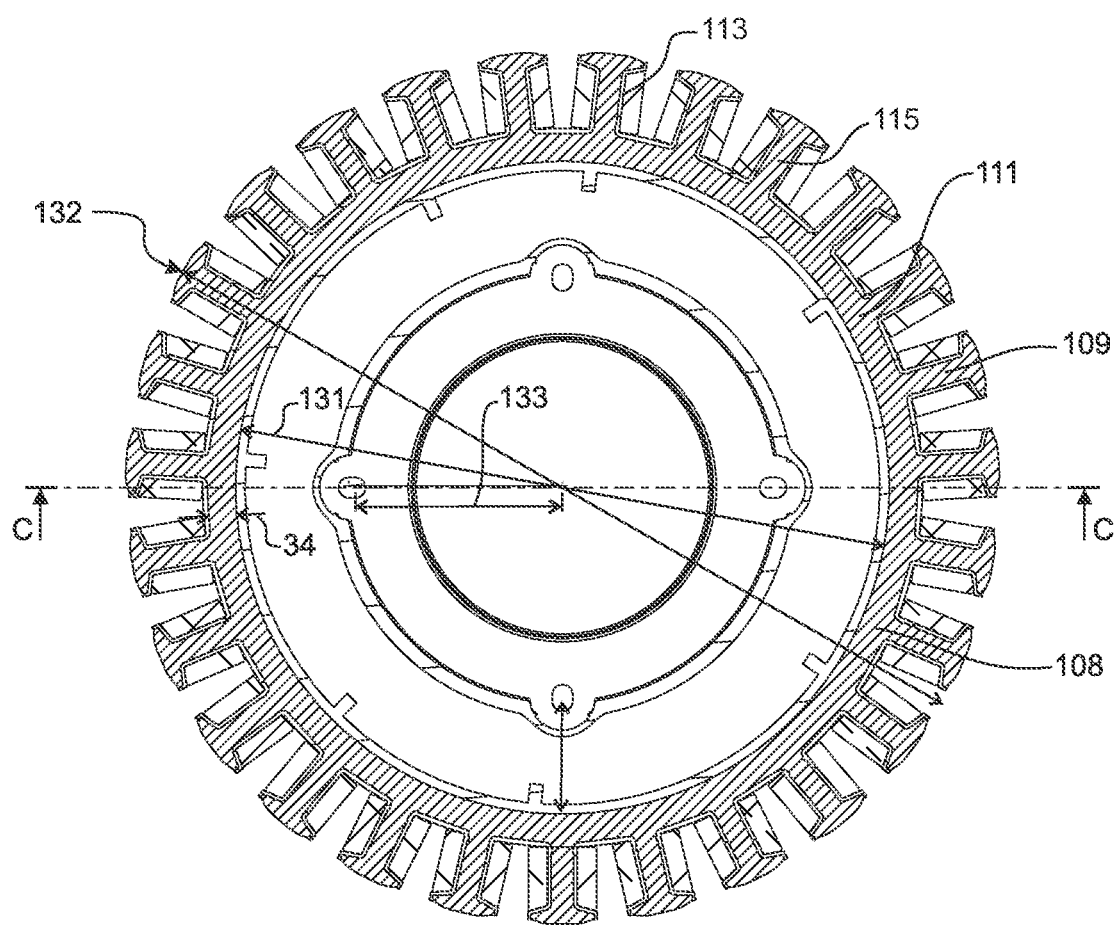
FIG. 4 is a cross section through line BB of FIG. 3.
Figure 5:
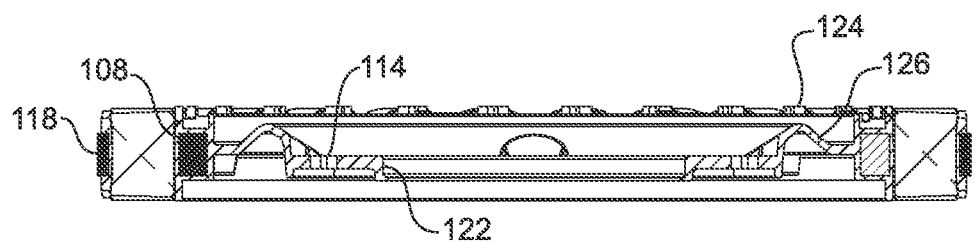
FIG. 5 is a cross section through line CC of FIG. 4.

The magnetically permeable core 108 may be formed of any suitable material, including for example a sintered ferritic powder, but most preferably is formed from steel laminations 115. In general form, laminations of the laminated steel lie in planes substantially parallel to the plane of the annular ring of the stator. The plan view of FIG. 4 illustrates the outline shapes of the laminations 115 while the cross section of FIG. 5 illustrates edges of the laminations 115.

The lamination steel may be, for example, a fully processed non-oriented grain lamination steel with a nominal loss of about 7 w/kg.

The plastic material over moulding the core may be any suitable plastic. For example, one suitable material is a polybutylene terephthalate (PBT) sold as "CRASTIN" by Dupont Corporation.

The stator mounting portion 106 includes mounting locations generally designated 112. In the illustrated embodiment, each fastening location 112 includes a fastening hole 114. The fastening holes 114 may be slotted or otherwise larger than the outside diameter of the fastener intended to pass through the fastening holes. This allows for manufacturing tolerance in the machine to which the stator will be secured.

The mounting portion 106 may include a locating portion 116 in addition to the fastening locations 112. The locating portion 116 may provide for aligning the stator concentrically with a shaft of the motor. For example, the locating portion 116 may comprise a circular opening 120 at the centre of the stator. A lip or rim 122 of the opening 120 may locate on a corresponding feature or features of a bearing housing or bearing supporting the drive shaft.

The fastening locations 112 (with fastening holes 114) are located in the mounting portion 106 between the opening 120 and the annular ring portion 104. In the illustrated embodiment, these fastening locations and fastening holes are centred more than 40 mm from the centre of the stator. In some embodiments, they may be more than 45 mm from the centre of the stator, more than 50 mm from the centre of the stator, more than 55 mm from the centre of the stator, more than 60 mm from the centre of the stator and preferably more than 65 mm from the centre of the stator, or about 68 mm from the centre of the stator.

The mounting locations and fastening holes 114 are centred a distance from the inside surface of the annular ring portion 111 of the core 108 that is greater than the distance that the radially extending pole portions 109 of the core 108 extend beyond the outer surface of the annular ring portion of the core 108. For example, in one embodiment, the fastening holes may be centred more than 30 mm from the inside surface of the annular ring portion of the core 108, more than 32 mm, more than 34 mm and preferably more than 35 mm from the inside surface of the stator core annular ring portion. Whereas the pole portions may extend less than 30 mm from the outside surface of the annular ring portion of the core 108, and most preferably less than 27 mm. In other embodiments, the pole portions may extend more than 30 mm from the outside surface of the annular ring, for example up to 40 mm, in which case the fastening holes may be more than 40 mm from the inside surface of the annular ring. The pole portions may extend much less than 30 mm from the outer surface over the annular ring, for example, only 15 mm.

In plan view, each pole portion is T-shaped, with a cross bar portion of each pole portion supported spaced apart from the annular ring portion of the stator by a trunk portion of each pole portion.

The mounting portion 106 of the stator may be formed entirely from plastic. The mounting portion 106 may be formed in one operation with over moulding of the core 108.

The mounting portion may include one or more frustoconical portions concentric with the annular ring portion of the stator. The illustrated stator includes an inner frustoconical portion 124 and an outer frustoconical portion 126. Together, the frustoconical portions 124 and 126 form a circular ridge 128 (when viewed from one side of the stator as in FIG. 1) and circular valley 130 (when viewed from the other side of the stator as in FIG. 2).

The overall diameter 132 of the stator may be about 280 mm. In other embodiments, the diameter may be between 320 and 270, between 290 and 270 or between 290 and 240.

The width 134 of the annular ring portion of the stator core may be about 9 mm. In other embodiments, the width of the annular ring portion of the stator core may be between 5 mm and 15 mm.

The diameter 131 of the inner surface of the stator core 108 may be about 208 mm. In other embodiments, the diameter may be between 230 mm and 190 mm or between 250 mm and 120 mm.

The radial distance 133 of the fastening locations from the centre of the stator may be about 68 mm. In other embodiments, the radial distance may be between 40 mm and 80 mm.

The thickness of the plastic insulator 113 in the region of the radially projecting pole cores may be about 1.5 mm. The thickness of the mounting portion 106 may be about 4 mm in the vicinity of the mounting locations 112 and about 3 mm adjacent the annular portion 104 of the stator. The thickness of the mounting portion 106 may be about 2 mm in the region of the frustoconical portions 124 and 126.

Preferably, the motor is wound such that each projecting pole includes a discreet conductor coil, with each pole being associated with one of three phase windings of the motor. Each phase winding is therefore associated with ⅓ of the poles of the stator.

The coils of each pole associated with a particular phase winding are connected in series. The coils of a phase winding may be wound from a single continuous conductor, the conductor forming a coil of each respective pole in series.

In the Figures, the coils of the windings are illustrated as amorphous blocks of material. This is to simplify the illustration. In practice, each illustrated block is a coil of conductor. Additional portions of conductor (not illustrated) interconnect the coils for a particular phase winding. These portions of conductor interconnecting the coils are located in the vicinity of the annular ring portion 104. A framework 125 of guideposts 127 and supporting surfaces 129 assist the arrangement of the interconnecting portions of conductor. According to this arrangement, first ends of the conductor of each phase winding terminate together at a connector 117. Second ends of the conductor of each phase winding terminate together at connectors 119. In different electrical configurations for the motor, it may be preferable for pairs of ends to terminate together. In one electrical arrangement for the motor, the phase windings are connected in a star configuration. In this configuration, an end of each of the three windings is connected together at a common connector 117.

Figure 6:
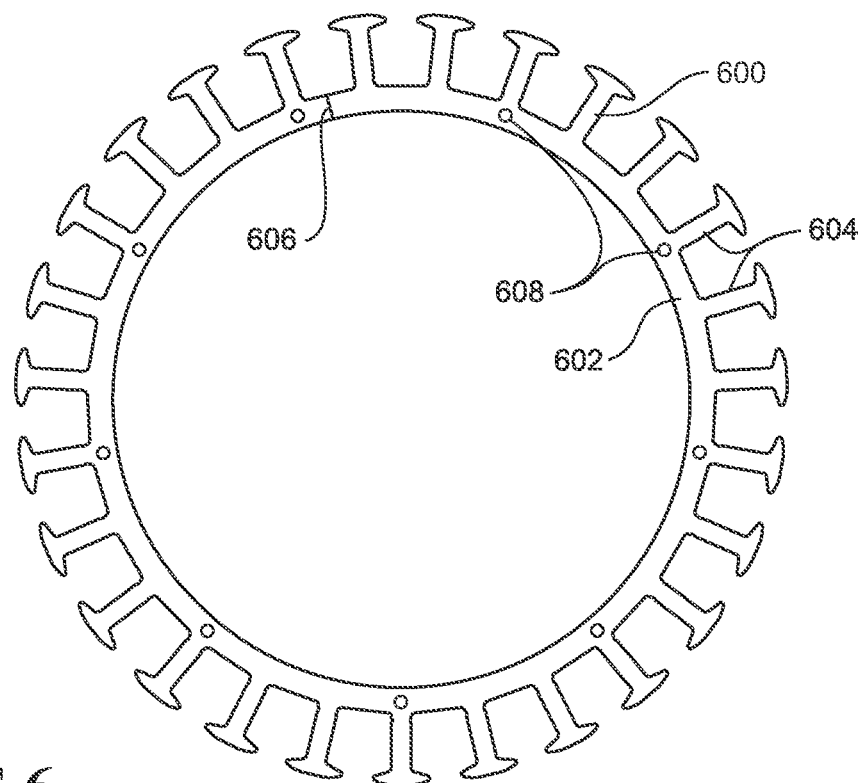
FIG. 6 is a plan view of a laminated core suitable for the stator of FIG. 1.
Figure 7:
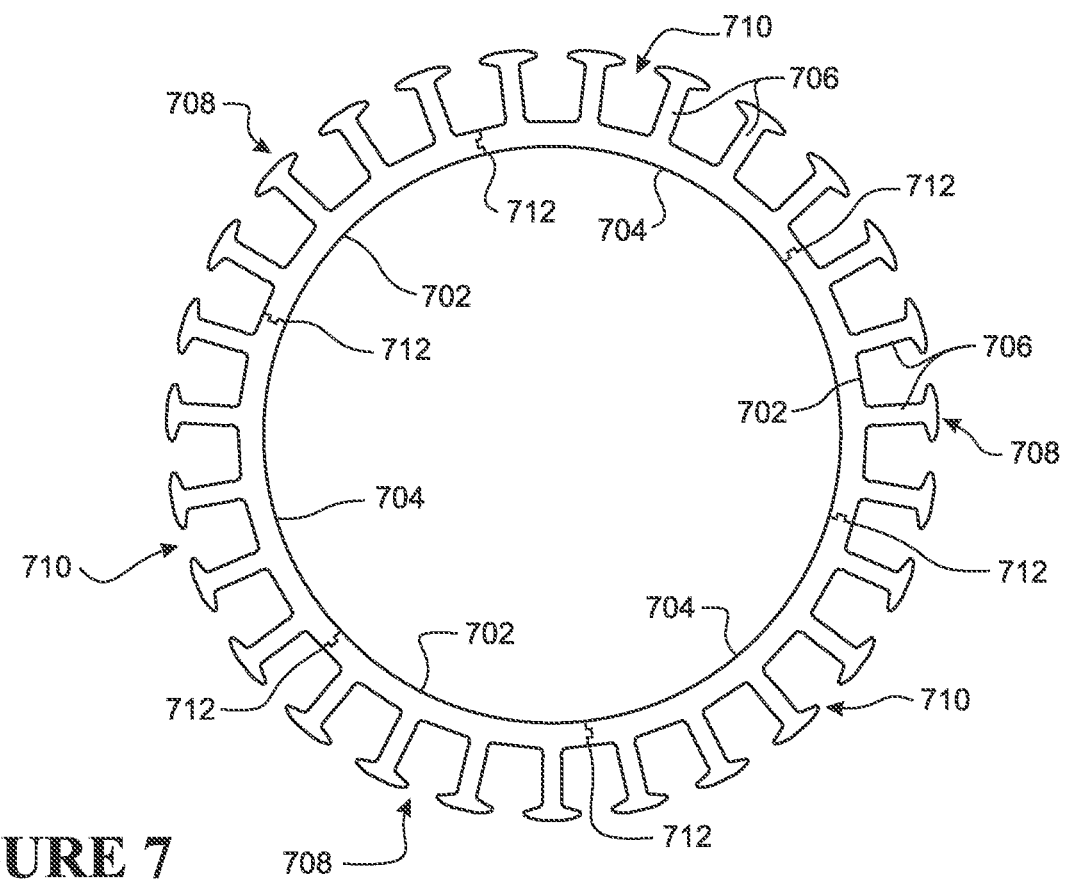
FIG. 7 is a plan view of an alternative laminated stator core suitable for the stator of FIG. 1.

Referring to FIGS. 6 and 7, alternative cores according to different methods of manufacturing a lamination stack 115 are illustrated. In the arrangement illustrated in FIG. 6, the stator core comprises a lamination formed from a helically, edgewise wound strip 600. The strip includes a band portion 602 and radially extending pole portions 604 at regular intervals. As the strip is wound edgewise, the pole portions splay apart slightly. And the turns of strip stack up to form the laminated stator core. The helical stack of turns may be secured by a plurality of rivets 608 or alternatively by interlocking punch down portions (not illustrated) where a tab of each layer of strip is punched into a recess in the layer below, the recess being formed by punching down the tab in that layer. One end 606 of the helically wound strip sits on the top of the stack. The other end of the helically wound strip sits on the bottom of the stack.

FIG. 7 illustrates an alternative embodiment in which the core is formed from multiple stacks of laminations. Each stack of laminations includes a segment 702 or 704 of the annular ring portion of the stator core and a plurality of radially extending pole core portions 706.

For a stator with 27 poles, the core preferably comprises 3 lamination stacks having 5 pole cores each, and 3 lamination stacks having 4 pole cores each. The 5-pole stacks 710 and the 4-pole stacks 708 may be assembled to form the stator core, with stacks 708 and 710 alternating around the stator core. The individual lamination stacks may be joined in any suitable fashion. For example the stacks may be butt-welded, or they may be simply restrained in place and held together abutting one another by the moulded plastic insulating layer. However, preferably, they are joined by interconnecting shapes at the butting ends of the annular ring portion 702, 704. For example, the interlocking shapes may form a dove-tail connection.

The laminations within each stack may be riveted, or otherwise secured together. For example they may be secured by an adhesive, or in some temporary fashion until the plastic over moulding, or they may be interlocked by appropriate punched connections between layers of the lamination.

The height of the lamination stack may vary depending on the torque requirement of the motor. For example, the height of the lamination stack may be between 10 mm and 35 mm depending on the output requirement for the motor.

Each lamination of the lamination stack may be about 0.5 mm thickness. For example, a lamination stack of 27 layers would have a stator core thickness of 13.5 mm. A stack of 38 layers would have a stator core thickness of 19 mm.

Figure 16:
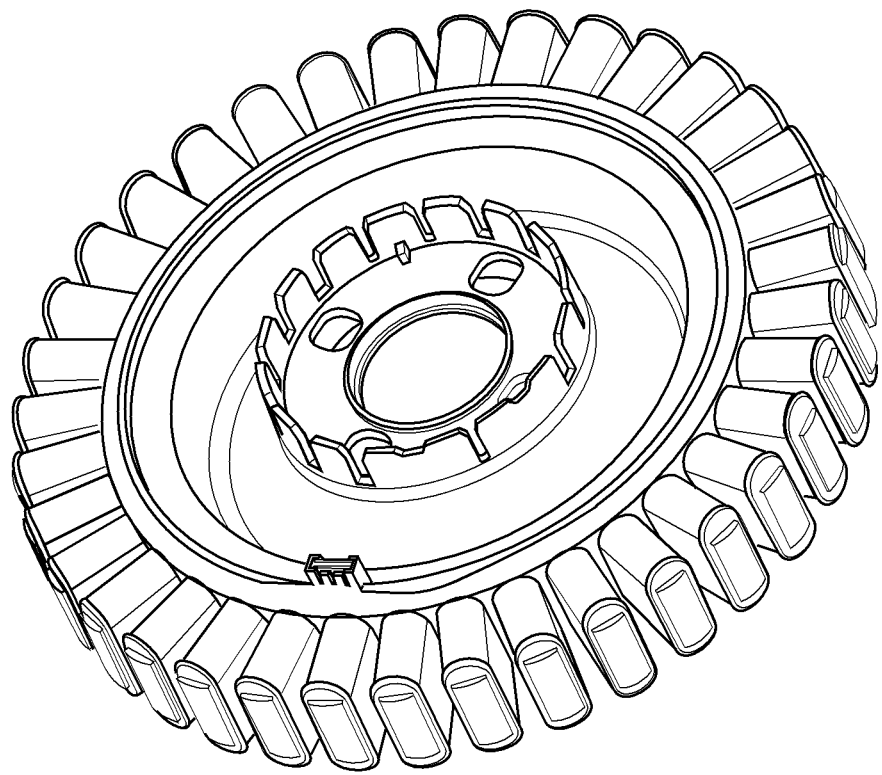
FIG. 16 is a perspective view of a prior art stator.
Figure 17:
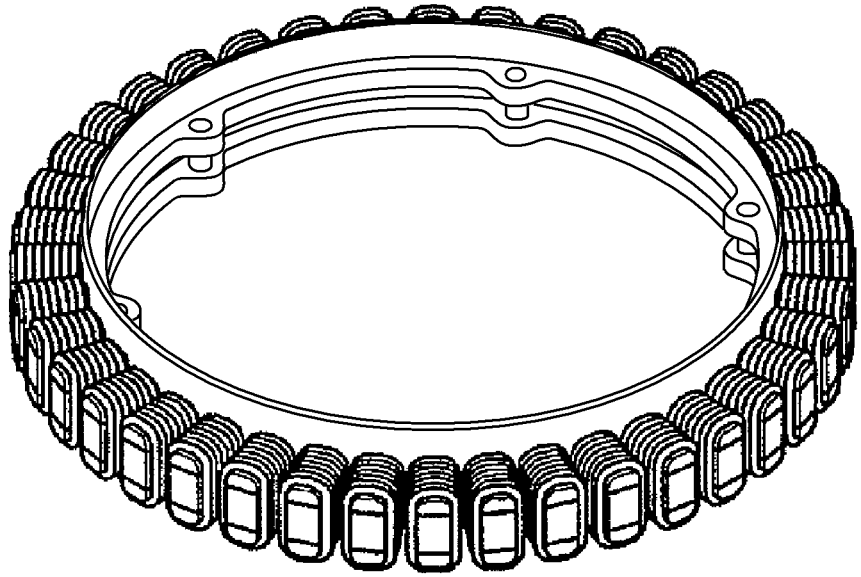
FIG. 17 is a perspective view of a prior art rotor.

The inventors have found that the described stator, intended for use in application in a laundry machine, provides lower noise than conventional stators such as are illustrated in FIGS. 16 and 17 and (labelled "prior art"), with rotation speeds up to 1600 rpm.

The described stator is for use with an external rotor having a ring of magnets facing inward toward the outer surfaces of the pole ends of the stator. For example, rotors are illustrated in FIGS. 8 to 11. In use, the stator is secure on the machine, with a shaft of the machine passing through the inner aperture 120 of the stator mounting portion. The rotor is secured to the shaft.

The stator is intended for a motor with a 4:3 rotor pole to stator pole ratio. Accordingly, the rotor for use with a 27 pole stator as illustrated should have 36 poles. As an alternative, the inventors believe a stator with 24 poles may achieve some of the benefits of the described stator. The corresponding rotor would have 32 poles.

Referring to FIGS. 8 to 11, the rotor 36 comprises a number of, hard ferrite or neodymium-iron-boron permanent magnet elements 37, arranged to form a permanent magnet ring 38 of such elements. The permanent magnet elements 37 could also be comprised of a blend of hard ferrite and neodymium-iron-boron material or other magnetic material such as, but not limited to, Samarium-cobalt. Alternatively the permanent magnet elements 37 could comprise a blend of these magnet materials and plastic material. The ring 38 of magnetic material can be supported by a rigid rotor support or housing 39. This may comprise an over moulded plastics annular ring, with a plastics hub. Alternatively, the housing could comprise pressed steel 39a (as in the rotor of FIG. 10) with the magnet elements attached therein. A single or multiple piece or multiple layer laminated backing ring 40 (see FIG. 8) could optionally be provided to increase the resulting magnetic flux field produced by the magnetic material. Preferably, the ring of permanent magnetic material 38 has an internal diameter just larger than the outside diameter of the stator. The combination achieves an air gap of between 2.5 mm and 0.5 mm. Each section (and the ring) is preferably less than 20 mm thick. It will be appreciated by those skilled in the art that there are many possible variations on the construction of a rotor 36 for use in a washing machine motor.

Figure 8:
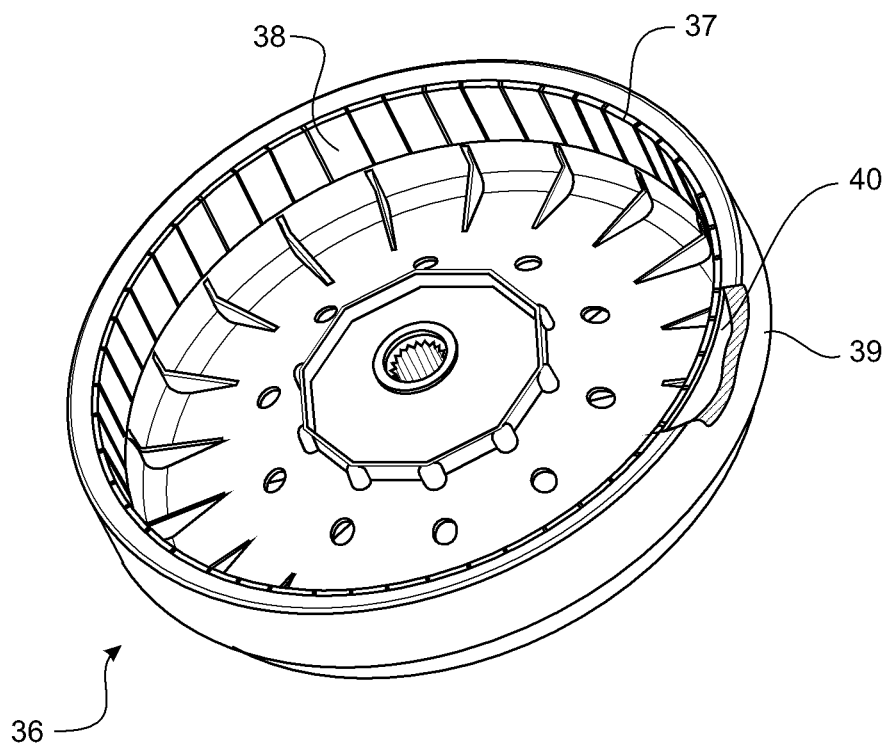
FIG. 8 is a perspective view from one side of the rotor suitable (for adaption to the number of rotor poles) for use with the stator of FIG. 1.
Figure 9:
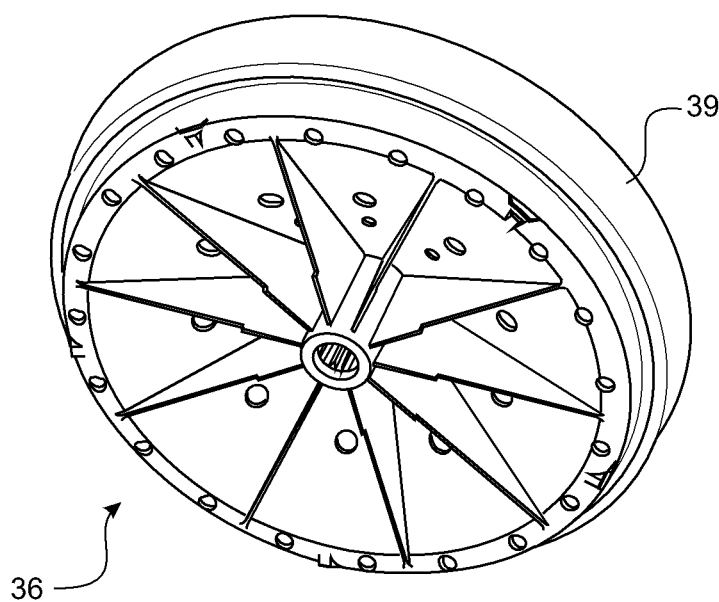
FIG. 9 is a perspective view of the rotor of FIG. 8 from the other side.
Figure 10:
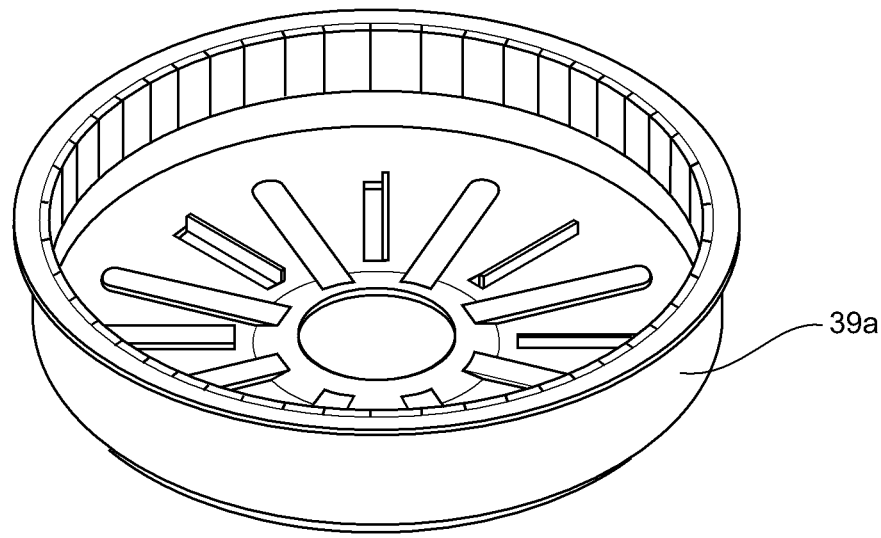
FIG. 10 is a perspective view of another rotor suitable (with adaptation of the number of rotor poles) for use with the stator of FIG. 1.
Figure 11:
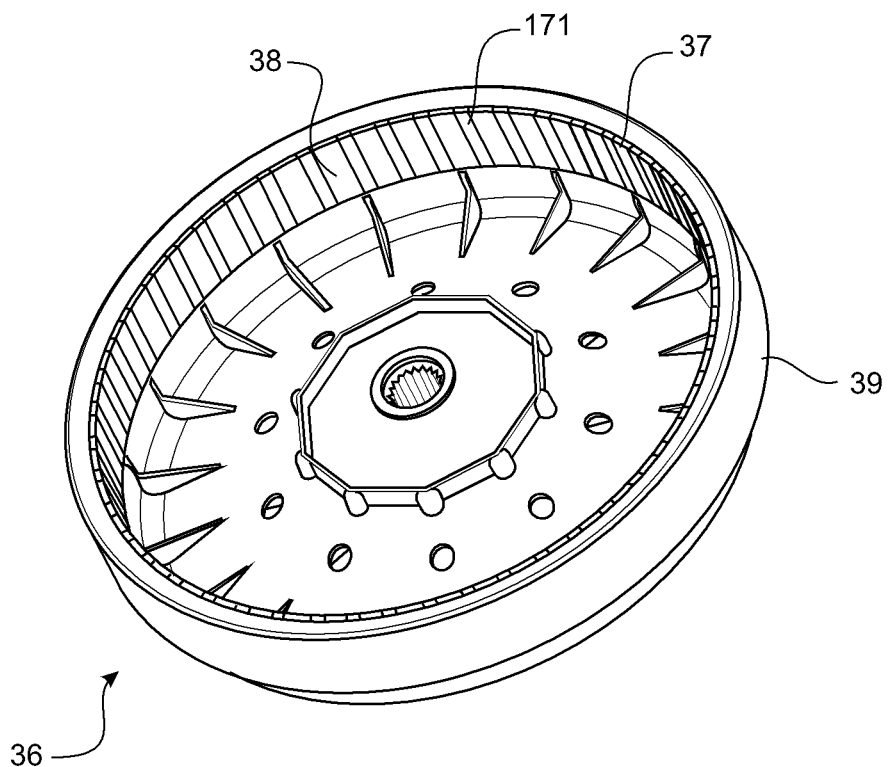
FIG. 11 is a perspective view of another rotor suitable (With adaptation of the number of rotor poles) for use with the stator of FIG. 1.

FIGS. 8 and 9 show just one possibility in a general form for exemplary purposes. FIGS. 10 and 11 show an alternative possible rotor.

Further details of possible rotor constructions are described in our U.S. Pat. No. 5,040,285, our PCT international publication WO2009/017430 and in our pending US patent application U.S. 61/358,746. The whole content of each application is hereby incorporated by reference. The preferred motor has a magnet to stator pole ratio of 4:3. The number of rotor magnets shown FIGS. 10 and 11 are illustrative only to demonstrate the physical nature of the rotor/stator. The actual number of magnets might be different. As described in our WO2009/017430, the rotor 36 may be magnetised to produce a Halbach-style resulting magnetic flux field the same or similar to that produced by a standard Halbach array.

As described in WO2009/017430, each permanent magnet element 37 in the rotor may be produced in a manner such that it comprises magnetic domains pre-aligned into a magnetic domain alignment pattern. The term "magnetic domain alignment pattern" refers to the orientation of the magnetic domains 41 occurring as a result of the manufacture process. Multiple magnet elements can be arranged together to create magnetic material with pre-aligned magnetic domains that enable production of a Halbach-style resulting magnetic flux field when the magnet material is subsequently magnetised by a magnetisation pattern. A ring of such magnet elements can be assembled to produce a permanent magnet ring of the rotor. This can be magnetised to have a Halbach-style resulting magnetic flux field. This field is stronger than if isotropic or radially aligned anisotropic magnetic material is magnetised with the same flux field. A rotor with Halbach-style resulting magnetic flux field is the desired field in order to produce improved operating characteristics of the motor.

The magnet elements of the permanent magnet ring might be curved commensurate with the curvature of the rotor.

"Halbach style" refers to a resulting magnetic flux field that is the same as or is similar to a magnetic flux field produced by a traditional Halbach array magnet arrangement. The term "magnetisation pattern" refers to the external magnetic flux field employed to energise the magnet element according to the domain alignment pattern, causing the magnets to become magnetised. The term "resulting magnetic flux field" refers to the magnetic flux field that exists in the magnet elements (and surrounding structure, where applicable) after production, assembly and magnetisation.

Further detail, alternatives and options concerning the magnet elements, which may be used in some embodiments of a rotor for the motor herein, are set forth in WO2009/017430.

An embodiment of the invention might comprise a washing machine with a motor as described above, or another embodiment might comprise the motor itself, or the stator itself. Alternatively, the motor or stator could be used in another application, such as a power generation apparatus.

Figure 12:
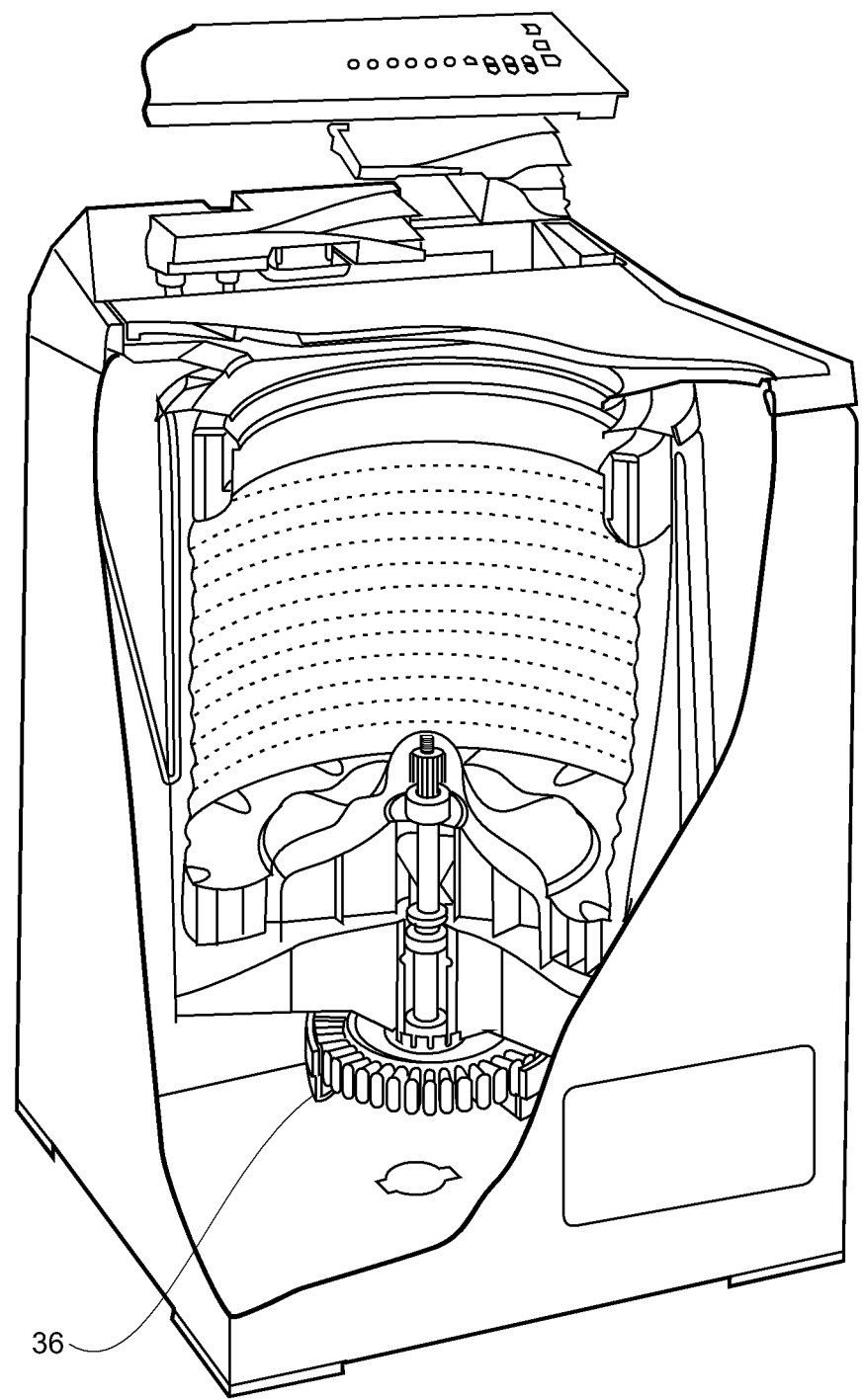
FIG. 12 shows a diagrammatic cutaway view of a washing machine of a vertical axis type that may incorporate a stator and/or motor according to the present invention.

A washing machine using the motor described could take one of many forms. For example, referring to FIG. 12, one embodiment comprises a top loading washing machine with an outer wrapper and a tub suspended within the wrapper. A rotating drum with perforated walls is disposed in and rotatable within the suspended tub. A motor, comprising a stator and rotor as previously desired, is coupled to the rotating drum via a rotational shaft. The motor can be operated by a controller to spin and oscillate the rotating drum to carry out washing of clothes. The inventors have found the described stator of the motor to be less susceptible to resonance relative to prior art stators of similar size, weight and output. These may make the motor as a whole less expensive or operate with less noise.

Figure 13:
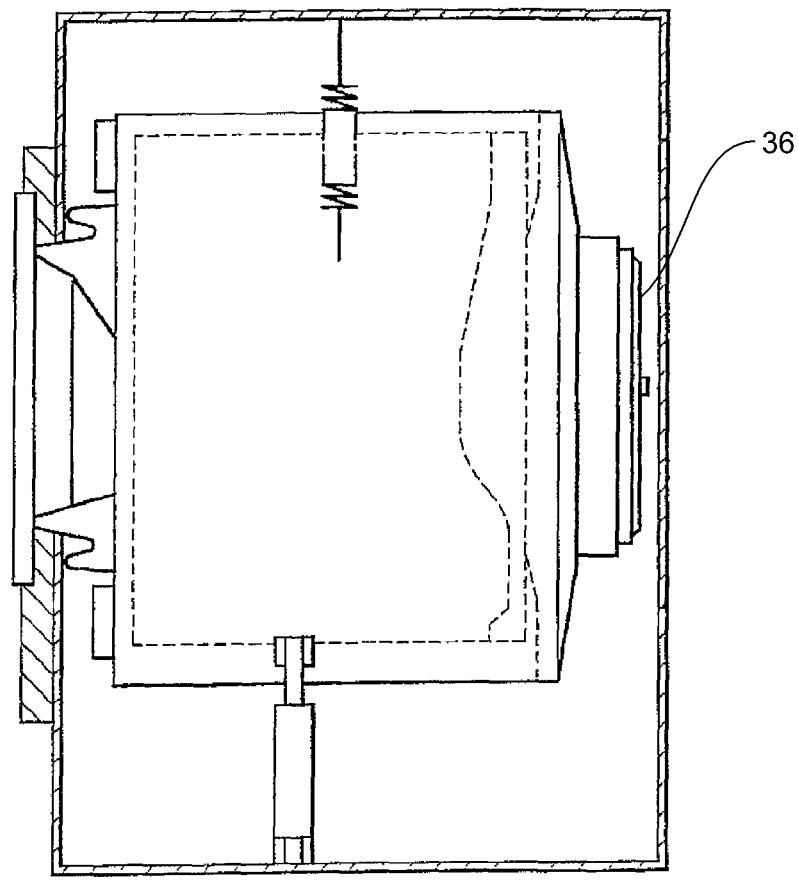
FIG. 13 shows a diagrammatic view of a horizontal axis washing machine with front access that may incorporate the stator and/or motor according to the present invention.

Referring to FIG. 13, another embodiment comprises a front loading horizontal axis washing machine with an outer wrapper and a rotating drum housing suspended in the outer wrapper. A rotating drum is disposed in and rotatable within the rotating drum housing. A door provides access to the rotating drum for introducing or removing clothing to be washed. A gasket may be included to provide a seal between the door and the rotating drum. A rotor is coupled to the rotating drum via a rotational shaft and the stator is coupled to the rear of the tub. The motor can be operated by a controller to spin and oscillate the rotating drum to carry out washing of clothes. The inventors have found the described stator of the motor to be less susceptible to resonance relative to prior art stators of similar size, weight and output. These may make the motor as a whole less expensive or operate with less noise.

Figure 14:
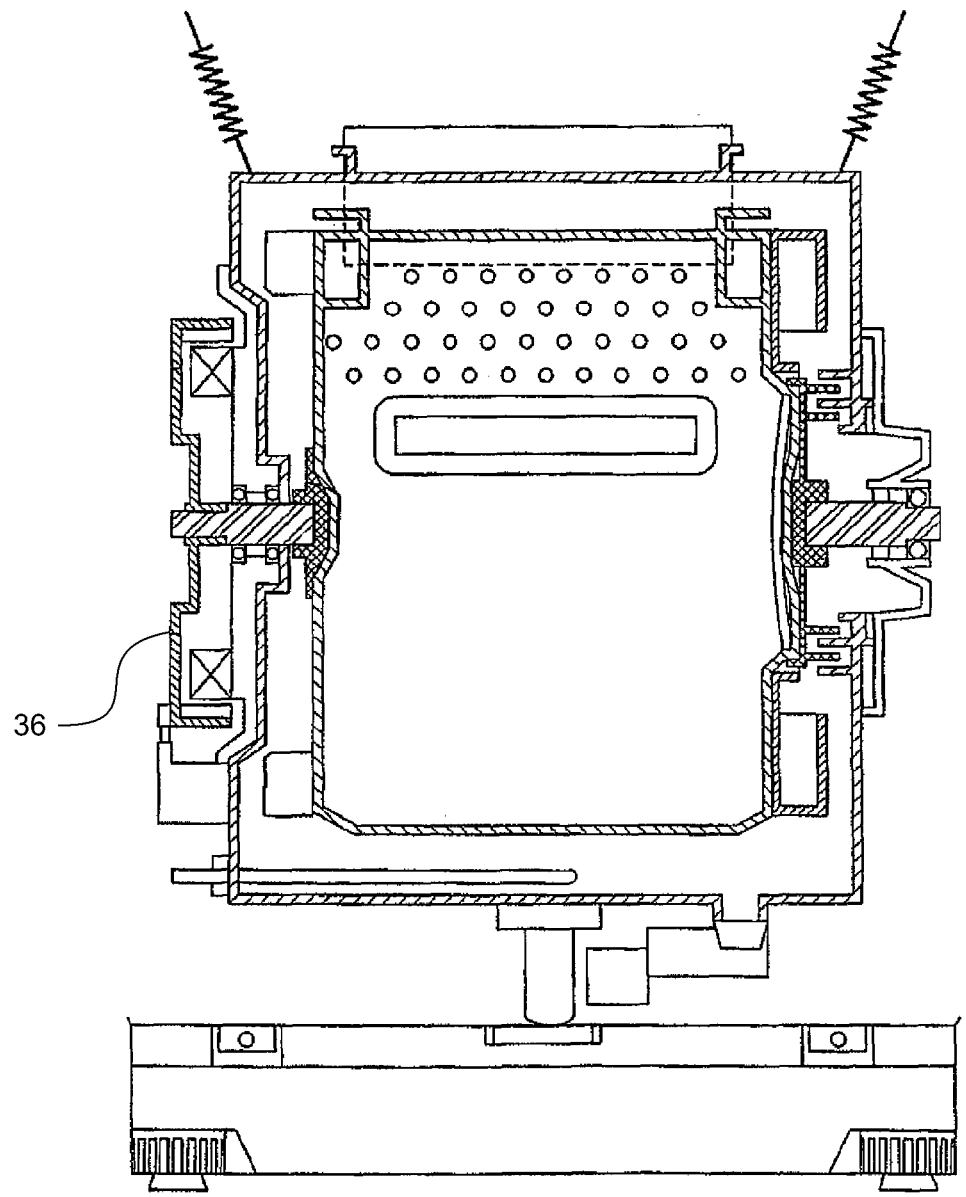
FIG. 14 shows a diagrammatic view of a horizontal axis washing machine with top or tilt access that may incorporate the stator and/or motor according to the present invention.

Referring to FIG. 14, another embodiment comprises a top loading or tilt access horizontal axis washing machine. The washing machine has an outer wrapper and a tub suspended within the outer wrapper. A rotating drum can rotate within the tub. Clothes can be introduced and taken from the rotating drum through an opening in the top of the drum. A motor, comprising a stator and rotor as previously desired, is arranged to drive the rotating drum via a rotational shaft. The motor can be operated by a controller to spin and oscillate the rotating drum to carry out washing of clothes. The inventors have found the described stator of the motor to be less susceptible to resonance relative to prior art stators of similar size, weight and output. These may make the motor as a whole less expensive or operate with less noise.

Figure 15:
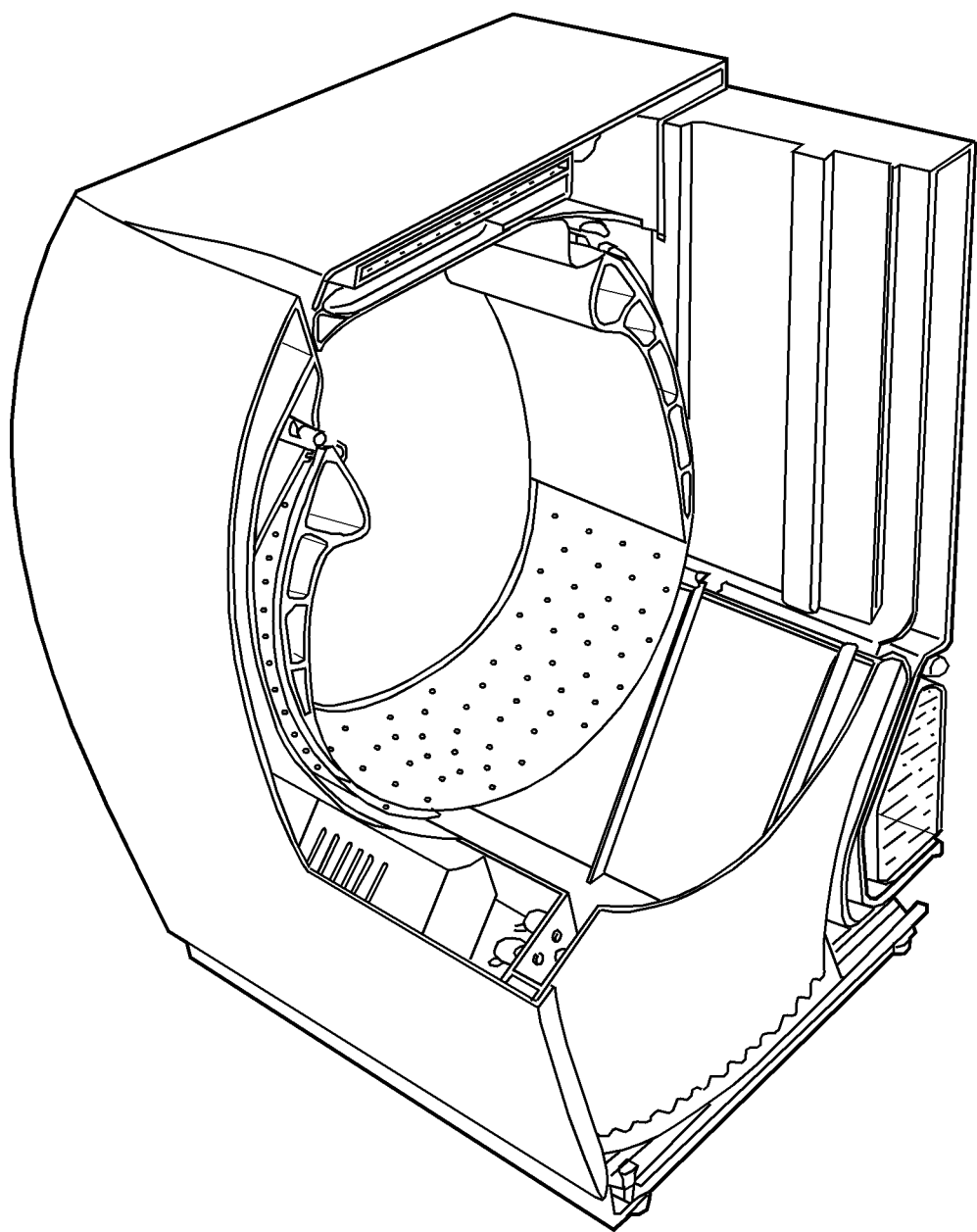
FIG. 15 shows a diagrammatic view of a horizontal axis laundry machine with tilt access that may incorporate the stator and/or motor according to the present invention.

FIG. 15 shows a tilt loading horizontal axis washing machine. The washing machine has an outer wrapper and a tub suspended within the outer wrapper. A rotating drum can rotate within the tub. Clothes can be introduced and taken from the rotating drum by tilting the drum. A motor, comprising a stator and rotor as previously desired, is arranged to drive the rotating drum via a rotational shaft. The motor can be operated by a controller to spin and oscillate the rotating drum to carry out washing of clothes. The inventors have found the described stator of the motor to be less susceptible to resonance relative to prior art stators of similar size, weight and output. These may make the motor as a whole less expensive or operate with less noise.

It will be appreciated that FIGS. 9 to 12 show just four examples of washing machines that could utilise a motor with a rotor containing magnetic elements produced in the manner described above. Other embodiments of the present invention could comprise other washing machines, operated by a motor as described above.

What is claimed is:

1. A stator comprising:
   a core of magnetically permeable material including an annular ring with an inner circumference between 120 mm diameter and 250 mm diameter and a width between 5 mm and 15 mm, a plurality of radiating extending poles spaced around the outer circumference of the annular ring, the poles extending outward from the annular ring between 15 mm and 40 mm,
   three phase windings, each winding comprising a plurality of coils, each coil arranged on ⅓ of the poles,
   an insulator insulating the poles from the windings,
   a plurality of fastening locations for fastening the stator to a machine, each fastening location being centred a distance radially inside the inner surface of the annular ring of the core, this distance being greater than the length that the poles extend beyond the outer circumference of the annular ring, and more than 40 mm from the centre of the stator.

2. The stator as claimed in claim 1, wherein the fastening locations are between 40 mm and 80 mm from the centre of the stator.

3. The stator as claimed in claim 1, wherein the fastening locations are between 50 mm and 75 mm from the centre of the stator.

4. The stator as claimed in claim 1, wherein the fastening locations are between 60 mm and 70 mm from the centre of the stator.

5. The stator as claimed in claim 1, wherein the stator includes a diaphragm portion extending inward from the annular ring to occupy an area within the inner circumference of the ring and that includes the fastening locations.

6. The stator as claimed in claim 5, wherein the fastening locations comprise apertures through the diaphragm portion.

7. The stator as claimed in claim 5, wherein the diaphragm portion is annular and occupies an area between the annular ring and an inner aperture spaced inward of the fastening locations.

8. The stator as claimed in claim 5, wherein the diaphragm includes at least one substantially frustoconical surface in a region between the fastening locations and the annular ring.

9. The stator as claimed in claim 5, wherein the diaphragm includes at least two substantially frustoconical portions between the fastening locations and the annular ring, the frustoconical portions joining to form a circular ridge when viewed from one side of the stator and a circular valley when viewed from the other side of the stator.

10. The stator as claimed in claim 9, wherein the height of the ridge or depth of the valley is less than the height of the annular ring.

* * * * *